(12) United States Patent
Hsu

(10) Patent No.: US 9,547,118 B2
(45) Date of Patent: Jan. 17, 2017

(54) LIGHT GUIDE PANEL WITH AN IMPROVED LIGHT GUIDE STRUCTURE

(71) Applicant: Ledyoung Technology Corporation, Tao-Yuan (TW)

(72) Inventor: Yen-Chou Hsu, Tao-Yuan (TW)

(73) Assignee: Ledyoung Technology Corporation, Tao-Yuan (TW)

( * ) Notice: Subject to any disclaimer, the term of this patent is extended or adjusted under 35 U.S.C. 154(b) by 38 days.

(21) Appl. No.: 14/641,319

(22) Filed: Mar. 7, 2015

(65) Prior Publication Data

US 2016/0259112 A1    Sep. 8, 2016

(51) Int. Cl.
*F21V 8/00* (2006.01)

(52) U.S. Cl.
CPC .......... *G02B 6/0038* (2013.01); *G02B 6/0061* (2013.01)

(58) Field of Classification Search
None
See application file for complete search history.

(56) References Cited

U.S. PATENT DOCUMENTS

| | | | | |
|---|---|---|---|---|
| 5,779,337 A * | 7/1998 | Saito | ................... | G02B 6/0038 362/23.15 |
| 6,074,069 A * | 6/2000 | Chao-Ching | ........ | G02B 6/0061 362/23.15 |
| 2001/0053075 A1 * | 12/2001 | Parker | ................... | A61M 21/02 362/617 |
| 2002/0051355 A1 * | 5/2002 | Egawa | ................. | G02B 6/0028 362/610 |
| 2002/0163790 A1 * | 11/2002 | Yamashita | ............. | G02B 5/045 362/612 |
| 2003/0128538 A1 * | 7/2003 | Shinohara | ............ | G02B 6/0016 362/610 |
| 2005/0243574 A1 * | 11/2005 | Teng | ..................... | G02B 6/0061 362/600 |
| 2005/0281052 A1 * | 12/2005 | Teng | ..................... | G02B 6/0038 362/615 |
| 2006/0018623 A1 * | 1/2006 | Yu | ......................... | G02B 6/0038 385/146 |
| 2009/0109683 A1 * | 4/2009 | Miyashita | .............. | G02B 5/045 362/297 |
| 2014/0104881 A1 * | 4/2014 | Yang | ..................... | G02B 6/0038 362/611 |

* cited by examiner

*Primary Examiner* — Britt D Hanley

(57) ABSTRACT

A light guide panel includes a panel body having incident edges extending around the periphery thereof and a strong light region defined in a front surface thereof, and a light guide structure including a plurality of transversely extended first light-guiding grooves located in the front surface of the panel body and longitudinally spaced from one another at a predetermined interval, each first light-guiding groove having a first peak value area facing toward said strong light region and two first valley value areas located at two opposite ends of the first peak value area, each first peak value area curved in direction from the incident edges of the panel body toward the strong light region, the gap between the first peak value areas of each two adjacent first light-guiding grooves being gradually reduced in direction from the incident edges toward the strong light region.

5 Claims, 5 Drawing Sheets

LIGHT GUIDE PANEL WITH AN IMPROVED LIGHT GUIDE STRUCTURE

BACKGROUND OF THE INVENTION

1. Field of the Invention

The present invention relates to light guide technology and more particularly, to a light guide panel having a light guide structure formed of curved light-guiding grooves on the surface thereof.

2. Description of the Related Art

The light guide structure of a conventional light guide panel is made by milling straight light-guiding grooves out of the surface of the light guide panel to control the optical performance of the surface of the light guide panel. However, because the light-guiding grooves are straight grooves and because the light guide panel is a multilateral panel having multiple incident surfaces, it is difficult to accurately control the optical performance. Therefore, a light guide panel having the light guide structure thereof formed of straight light-guiding grooves can maximumly have only two incident surfaces, limiting the light guide panel's optical performance.

SUMMARY OF THE INVENTION

The present invention has been accomplished under the circumstances in view. It is therefore the main object of the present invention to provide a light guide panel, which has a light guide structure formed of multiple curved light-guiding groove and located in a front surface of the light guide panel body thereof, and capable of enhancing the brightness of a specific area of the front surface without being limited by the appearance of the light guide panel body.

To achieve this and other objects of the present invention, a light guide panel comprises A light guide panel comprises a panel body and a light guide structure. The panel body comprises a plurality of incident edges extending around the periphery thereof and a strong light region defined in a front surface thereof. The light guide structure comprises a plurality of first light-guiding grooves located in the front surface of the panel body and transversely extended through two opposite lateral sides of the front surface of the panel body and longitudinally spaced from one another at a predetermined interval. The first light-guiding grooves are curved grooves, each comprising a first peak value area and two first valley value areas at two opposite ends of the first peak value area. Each first peak value area is curved in direction from the incident edges of the panel body toward the strong light region. Further, each first peak value area faces toward the strong light region. Further, the gap between the first peak value areas) of each two adjacent first light-guiding grooves is gradually reduced in direction from the incident edges toward the strong light region.

DETAILED DESCRIPTION OF THE PREFERRED EMBODIMENT

Figure 1:
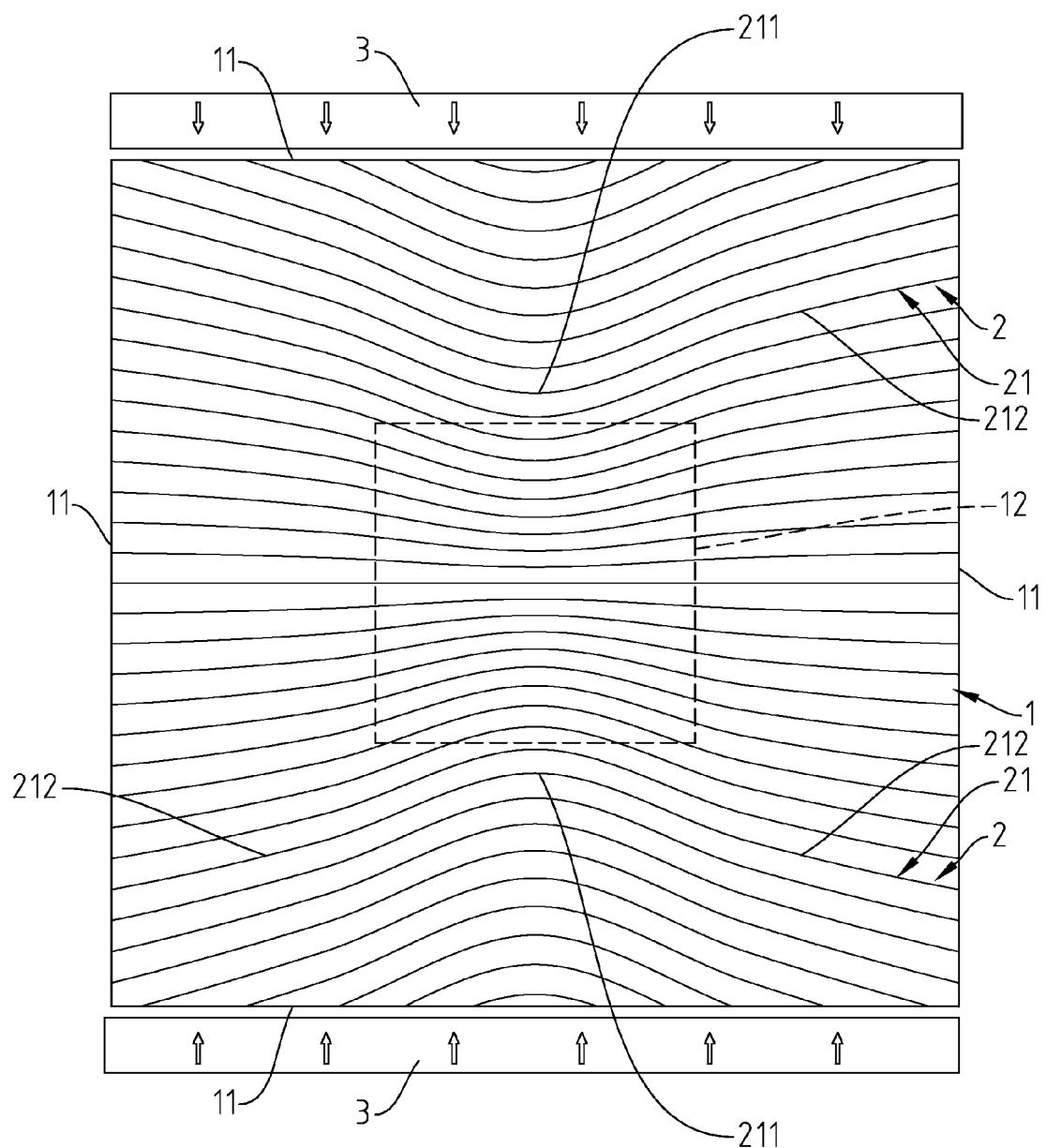
FIG. 1 is a front view of a light guide panel in accordance with a first embodiment of the present invention.
Figure 2:
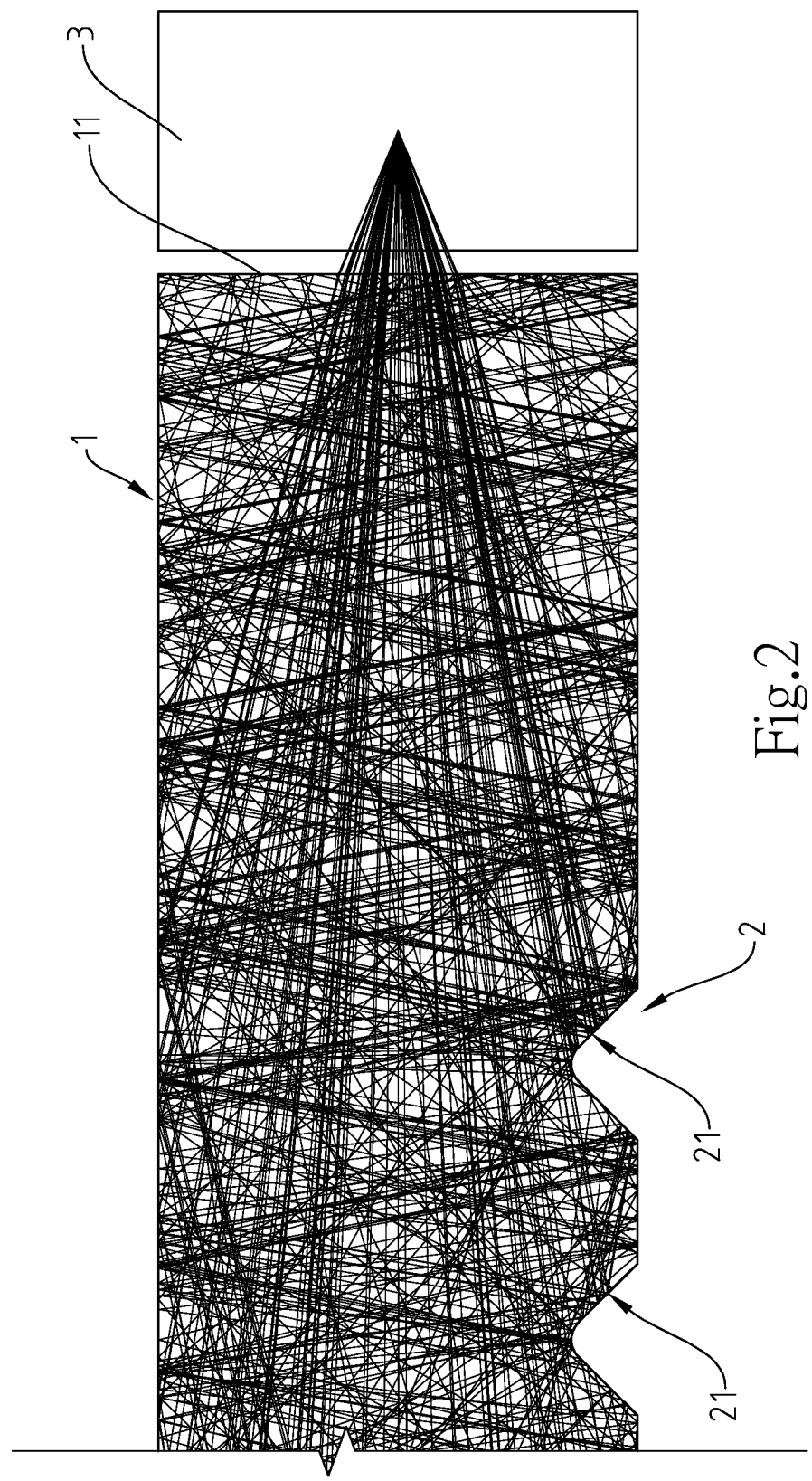
FIG. 2 is a schematic sectional view of the light guide panel in accordance with the first embodiment of the present invention.

Referring to FIGS. 1 and 2, a light guide panel in accordance with a first embodiment of the present invention is shown. The light guide panel comprises a panel body 1, and a light guide structure 2 located in one surface, for example, the front surface of the panel body 1.

The panel body 1 comprises a plurality of incident edges 11 around the periphery thereof, and a strong light region 12 defined in the front surface thereof.

The light guide structure 2 comprises a plurality of first light-guiding grooves 21 transversely extended through two opposite lateral sides of the front surface of the panel body 1 and longitudinally spaced from one another at a predetermined interval. These first light-guiding grooves 21 are curved grooves, each comprising a first peak value area 211, and two first valley value areas 212 at two opposite ends of the first peak value area 211. Each first peak value area 211 curves in direction from the incident edges 11 of the panel body 1 toward the strong light region 12. Further, each first peak value area 211 faces toward the strong light region 12. The curvature of the first peak value area 211 reduces gradually in direction from the incident edges 11 toward the strong light region 12 so that the gap between the first peak value areas 211 of each two adjacent first light-guiding grooves 21 is gradually reduced in direction from the incident edges 11 toward the strong light region 12, enabling the first peak value areas 211 of the first light-guiding grooves 21 to be densely arranged in the strong light region 12.

If light-emitting units 3 are mounted at two opposite incident edges 11 of the panel body 1, light emitted by the light-emitting units 3 will fall upon the respective incident edges 11 and go toward the inside of the panel body 1. At this time, because the first peak value areas 211 of the first light-guiding grooves 21 are densely gathered in the strong light region 12, a relatively stronger intensity of light will be projected out of the light region 12, and therefore, the design of the first peak value areas 211 of the first light-guiding grooves 21 can control the optical performance of the light guide panel without being limited by the outer appearance of the panel body 1 and the number of the light-emitting units 3. Therefore, a light guide panel in accordance with the first embodiment of the present invention is practical for use in an advertising light box, side-emitting lighting device or light guide module.

Figure 3:
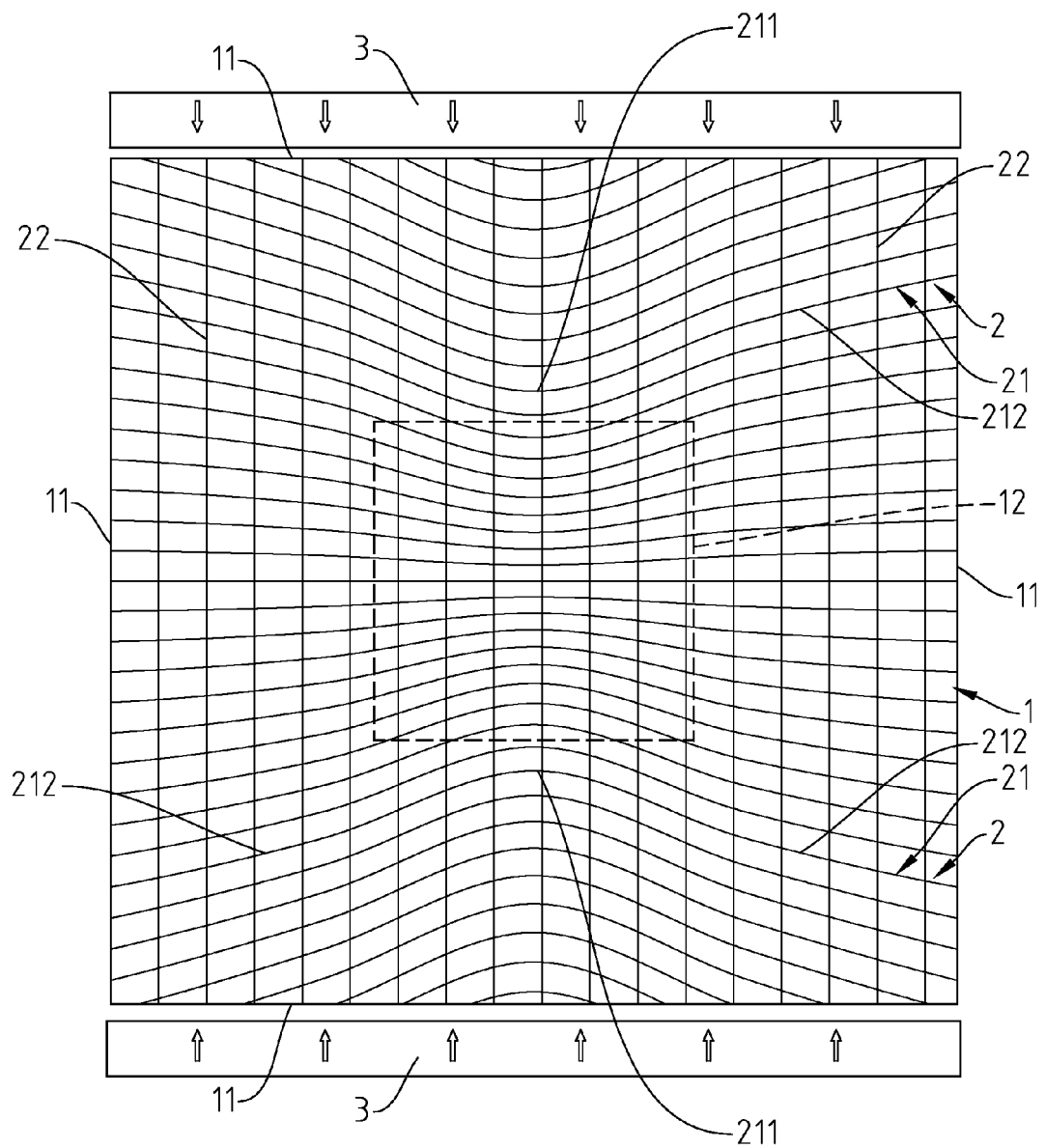
FIG. 3 is a front view of a light guide panel in accordance with a second embodiment of the present invention.

Referring to FIG. 3, a light guide panel in accordance with a second embodiment of the present invention is shown. According to this second embodiment, the light guide structure 2 further comprises a plurality of second light-guiding grooves 22 longitudinally extended through opposing top and bottom sides of the front surface of the panel body 1 and transversely spaced from one another at a predetermined interval. These second light-guide grooves 22 are straight grooves respectively intersected with the first light-guiding grooves 21, each comprising a first peak value area 211, and two first valley value areas 212 at two opposite ends of the first peak value area 211. If light-emitting units 3 are mounted at two opposite incident edges 11 of the panel body 1, light emitted by the light-emitting units 3 will fall upon the respective incident edges 11 and go toward the inside of the panel body 1. At this time, subject to the light guiding functioning of the first light-guiding grooves 21 and second light-guide grooves 22, a relatively stronger intensity of light will be emitted out of the light region 12, and therefore, the design of the first peak value areas 211 and second light-guide grooves 22 of the first light-guiding grooves 21 can control the optical performance of the light guide panel without being limited by the outer appearance of the panel body 1 and the number of the light-emitting units 3.

Figure 4:
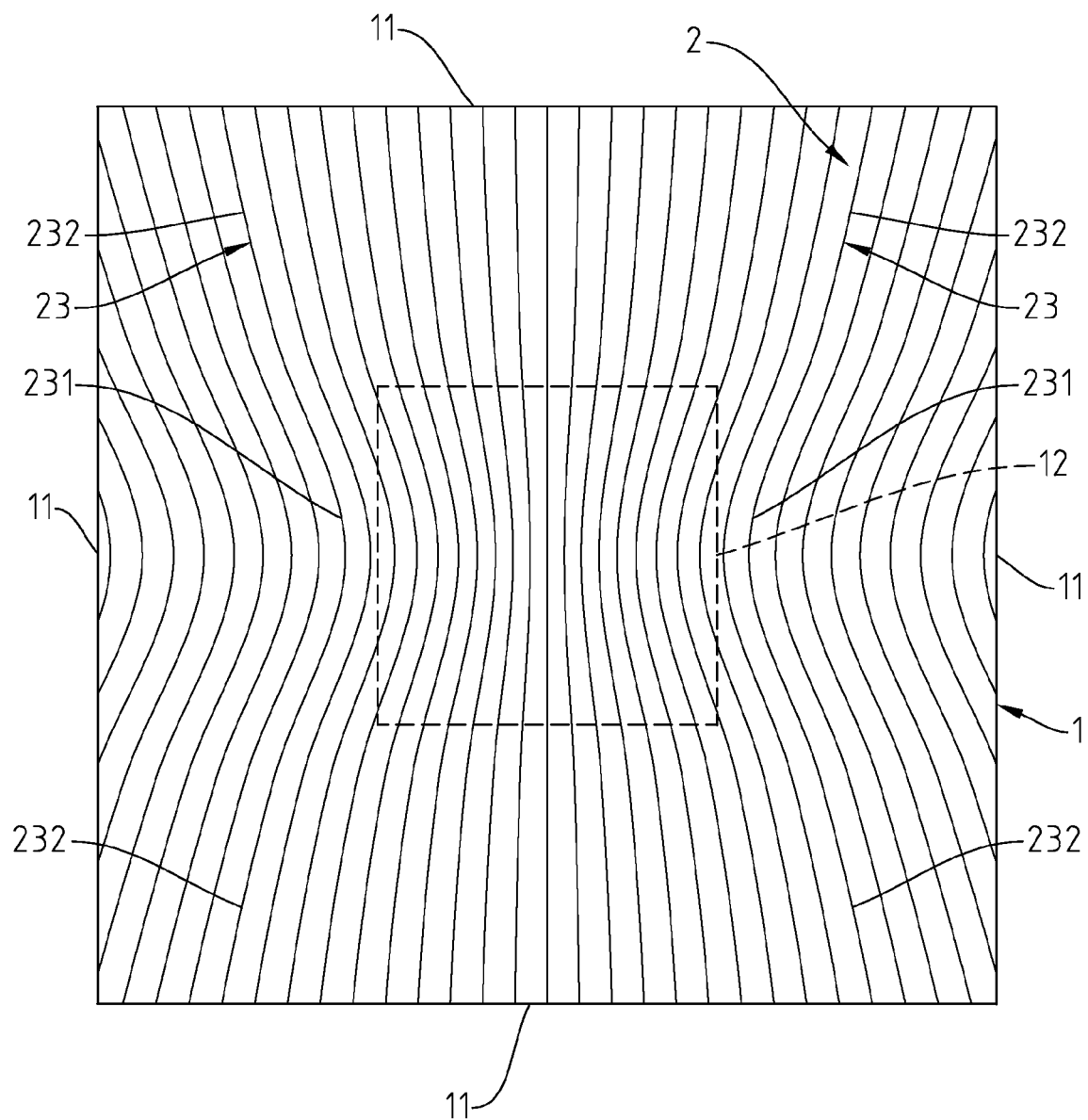
FIG. 4 is a front view of a light guide panel in accordance with a third embodiment of the present invention.

Referring to FIG. 4, a light guide panel in accordance with a third embodiment of the present invention is shown. According to this third embodiment, the light guide structure 2 comprises a plurality of third light-guiding grooves 23 longitudinally extended through opposing top and bottom sides of the front surface of the panel body 1 and transversely spaced from one another at a predetermined interval. These third light-guiding grooves 23 are curved grooves, each comprising a second peak value area 231, and two second valley value areas 232 at two opposite ends of the second peak value area 231. Each second peak value area 231 curves in direction from the incident edges 11 of the panel body 1 toward the strong light region 12. Further, each second peak value area 231 faces toward the strong light region 12. The curvature of the second peak value area 231 reduces gradually in direction from the incident edges 11 toward the strong light region 12 so that the gap between the second peak value areas 231 of each two adjacent third light-guiding grooves 23 is gradually reduced in direction from the incident edges 11 toward the strong light region 12, enabling the second peak value areas 231 of the third light-guiding grooves 23 to be densely arranged in the strong light region 12.

Figure 5:
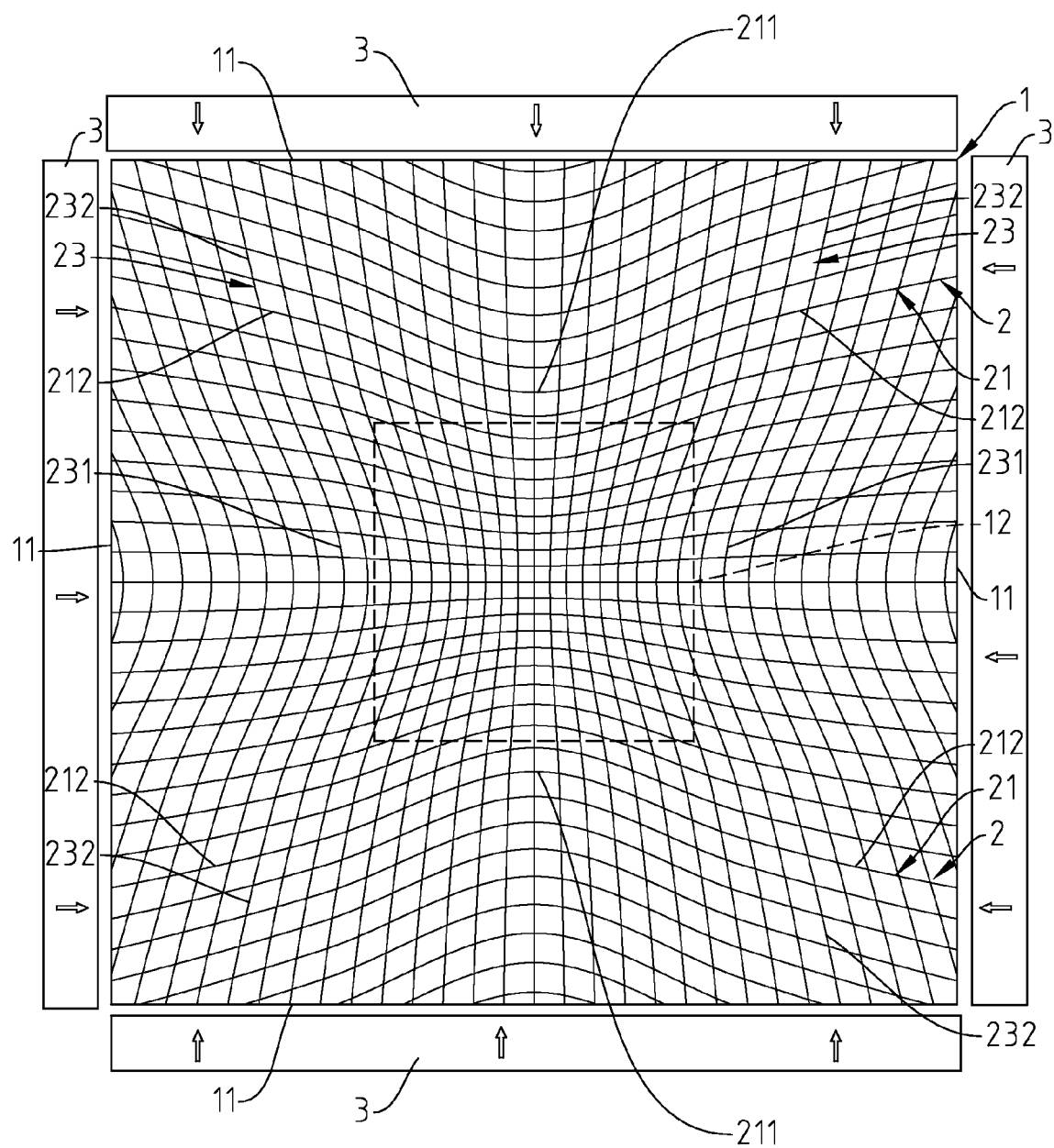
FIG. 5 is a front view of a light guide panel in accordance with a fourth embodiment of the present invention.

Referring to FIG. 5, a light guide panel in accordance with a fourth embodiment of the present invention is shown. According to this fourth embodiment, the light guide structure 2 comprises a plurality of first light-guiding grooves 21 and a plurality of third light-guiding grooves 23 respectively intersected with the first light-guiding grooves 21. If light-emitting units 3 are mounted at the incident edges 11 of the panel body 1, light emitted by the light-emitting units 3 will fall upon the respective incident edges 11 and go toward the inside of the panel body 1. At this time, subject to the light guiding functioning of the first light-guiding grooves 21 and third light-guide grooves 23, a relatively stronger intensity of light will be emitted out of the light region 12, and therefore, the design of the first peak value areas 211 of the first light-guiding grooves 21 and the second peak value areas 231 of the third light-guide grooves 23 can control the optical performance of the light guide panel without being limited by the outer appearance of the panel body 1 and the number of the light-emitting units 3. Further, the amount of the first light-guiding grooves 21 and second light-guiding grooves 22 of the light guide structure 2 can be increased or reduced subject to actual needs.

What the invention claimed is:

1. A light guide panel, comprising:
   a panel body comprising a plurality of incident edges extending around the periphery thereof and a strong light region defined in a front, central surface thereorf; and
   a light guide structure comprising a plurality of first light-guiding grooves located in said front surface of said panel body and transversely extended through two opposite lateral sides of said front surface of said panel body and longitudinally spaced from one another at a predetermined interval, said first light-guiding grooves being curved grooves, each said first light-guiding groove comprising a first peak value area and two first valley value areas at two opposite ends of said first peak value area, each said first peak value area curved in direction from said incident edges of said panel body toward said strong light region, each said first peak value area facing toward said strong light region, the gap between said first peak value areas of each two adjacent said first light-guiding grooves being gradually reduced in direction from said incident edges toward said strong light region.

2. The light guide panel as claimed in claim 1, wherein the curvature of said first peak value area reduces gradually in direction from said incident edges toward said strong light region so that the gap between said first peak value areas of each two adjacent said first light-guiding grooves is gradually reduced in direction from said incident edges toward said strong light region.

3. The light guide panel as claimed in claim 1, wherein said light guide structure further comprises a plurality of second light-guiding grooves located in said front surface of said panel body and longitudinally extended through opposing top and bottom sides of said front surface of said panel body and transversely spaced from one another at a predetermined interval and respectively intersected with said first light-guiding grooves, said second light-guiding grooves being straight grooves.

4. The light guide panel as claimed in claim 1, wherein said light guide structure further comprises a plurality of third light-guiding grooves longitudinally extended through opposing top and bottom sides of said front surface of said panel body and transversely spaced from one another at a predetermined interval, said third light-guiding grooves being curved grooves, each said third light-guiding groove comprising a second peak value area and two second valley value areas at two opposite ends of said second peak value area, each said second peak value area curving in direction from said incident edges of said panel body toward said strong light region, each said second peak value area facing toward said strong light region, the gap between said second peak value areas of each two adjacent said third light-guiding grooves being gradually reduced in direction from said incident edges toward said strong light region.

5. The light guide panel as claimed in claim 4, wherein the curvature of said second peak value area reduces gradually in direction from said incident edges toward said strong light region so that the gap between said second peak value areas of each two adjacent said third light-guiding grooves is gradually reduced in direction from said incident edges toward said strong light region.

* * * * *